J. F. OBERLIN.
VEHICLE WHEEL RIM.
APPLICATION FILED OCT. 9, 1916.
1,316,055. Patented Sept. 16, 1919.
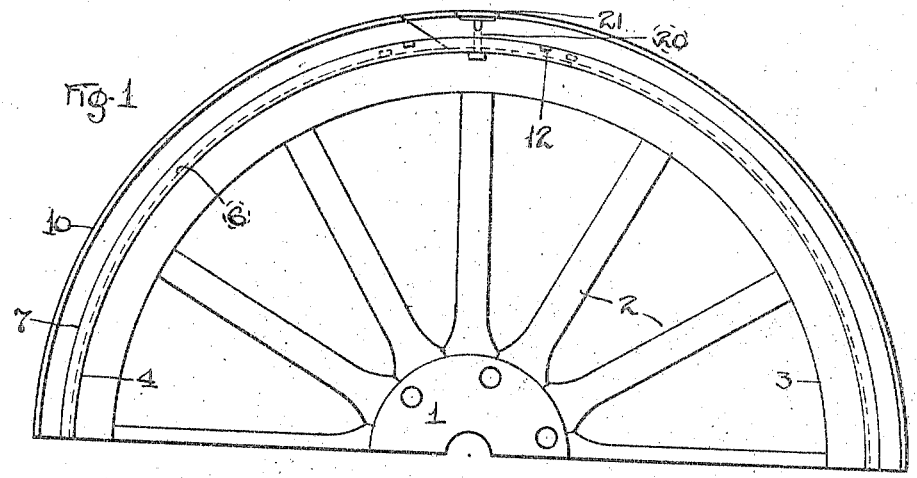
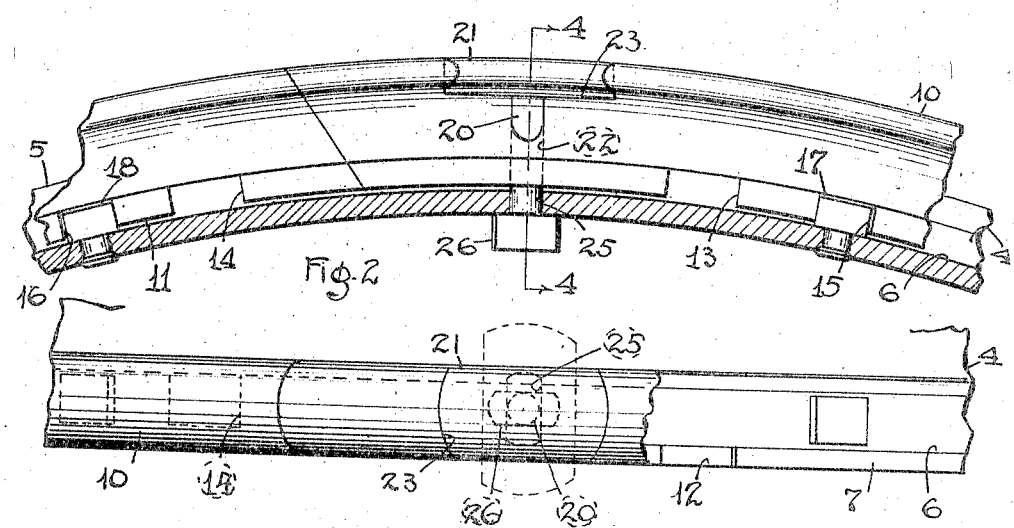
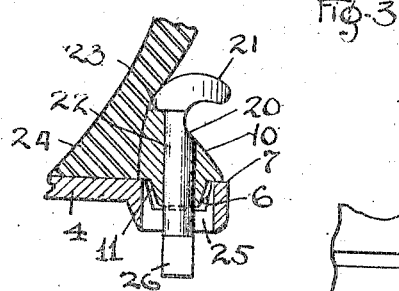
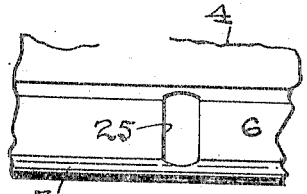
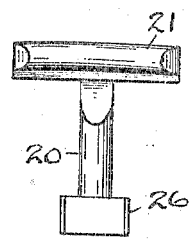
Inventor,
John F. Oberlin
by Fay, Oberlin & Fay
attys

UNITED STATES PATENT OFFICE.

JOHN F. OBERLIN, OF CLEVELAND HEIGHTS, OHIO, ASSIGNOR TO THE STANDARD PARTS COMPANY, OF CLEVELAND, OHIO, A CORPORATION OF OHIO.

VEHICLE-WHEEL RIM.

1,316,055.  Specification of Letters Patent.  Patented Sept. 16, 1919.

Application filed October 9, 1916. Serial No. 124,455.

*To all whom it may concern:*

Be it known that I, JOHN F. OBERLIN, a citizen of the United States, and a resident of Cleveland Heights, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements relate to vehicle wheel rims designed to support pneumatic tires, and more especially to the so-called Q. D. or quick detachable rims, such as are largely used in connection with automobiles and the like. These rims are characterized by being provided with a side flange which is rendered detachable in order to facilitate the placing of a tire on or its removal from the rim. The object of the present invention is to provide an improved locking device for securing such a flange in place on the rim, one that will be simple to construct and easy to operate, and, what is quite important, involve no loose parts which are apt to become lost or misplaced.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1 is a side elevational view of a portion of a wheel body showing a Q. D. rim embodying my present improved construction; Fig. 2 is a side elevational view of the meeting ends of the split side flange or ring with the locking device shown in operative position, the adjacent portion of the rim appearing in section; Fig. 3 is a plan view of the same parts that appear in Fig. 2; Fig. 4 is a transverse section of the locking device and adjacent portion of the rim, taken on the plane indicated by the line 4—4, Fig. 2; Fig. 5 is an elevational view of such locking device by itself; and Fig. 6 is a plan view of the portion of the rim with which such locking device directly coöperates.

The construction of the wheel body which is illustrated in part only in the aforesaid drawing, is a matter of indifference so far as the present invention is concerned, consisting, as shown, of the usual hub 1, spokes 2 and felly 3. The rim 4 which surrounds such felly is preferably of the so-called "Universal" type, that is it is provided with an abutment 5 around its rear edge (see Fig. 2), adapted to retain in place a continuous side flange or ring (not shown), which may be reversed to receive and hold either a straight side or clencher tire as desired. On the other hand, such rim may, of course, be provided with an integral side flange on such rear edge of either the straight side or clencher type.

The front edge of the rim 4 is provided with an encircling groove or depression 6, conveniently formed by beading such edge, the outer wall 7 of the groove lying flush or slightly below the outer surface of the rim so as to permit the aforesaid reversible side flange (when one is used) to be slipped over it, as occasion may require.

The part of the structure which is of present interest is the outer flange 10 that, as previously indicated, is transversely split at one point in its circumference, in order that it may be detachably secured to the rim, such flange having its inner edge 11 formed to seat in the aforesaid groove or depression 6, but being sufficiently resilient to permit its ends to be separated and the ring thus expanded until it can be removed from such groove. One end (the right as shown in Fig. 1) is most conveniently pried out first the wall of the groove being cut away at 12 to permit the insertion of a screw-driver or like implement, and the inner edge 11 of the ring which seats in the groove, being cut away at points 13 and 14, spaced a corresponding distance from the respective ends, with the same object in view. This edge is also cut away at other points 15 and 16, preferably located a trifle farther from the ends of the ring within the notches 13 and 14 just referred to, such cut away portions or notches 15 and 16 being adapted to interchangeably engage with lugs 17 and 18, riveted or otherwise formed in the bottom of the groove.

The end of the transversely split ring or flange which has just been described as being designed to be raised or pried out of the groove first, is formed as clearly shown in Fig. 1, to overlap the opposed ring-end, from which it will be obvious that if such overlapping end be secured against radial displacement the entire ring will be effectually locked to the rim.

In order thus to secure to the rim the ring-end in question, a locking member of the form clearly shown in Figs. 2, 3, 4 and 5 is provided, such member consisting of a short cylindrical stem or shaft 20, with a shallow rectangularly shouldered head 21 on its upper end, of circular outline in plan view (see Fig. 3), and of cross-sectional form, the same as that of the ring or flange itself (see Fig. 4). This member is rotatably secured with its spindle in a radial aperture 22 passing through the ring and its head in a corresponding shallow recess 23 in the upper portion of such ring. It will accordingly be seen that in one position, as shown in full lines in Fig. 3, such head will aline perfectly with the flange, forming, along with the spindle, in effect a part of such flange. Owing to the form, however, of the head 21, it will obviously be engaged by the tire-shoe 24 whichever way the ring faces, whether to receive a straight or clencher tire, and be held thereby against rotation.

The spindle 20 is long enough to project through a transverse slot 25 in the bottom of the groove 6, the form of such slot being best shown in Fig. 6, and a T-enlargement or head 26 is provided on such spindle-end of such form and dimensions as to permit it to pass readily through such slot when properly alined therewith. Such enlargement 26, however, will lie at right angles to the slot, when the head on the upper end of the spindle is alined with the ring. In other words, to insert such T-enlargement in the slot it is necessary that the head 21 be turned to the position shown in dotted outlines in Fig. 3, at right angles to the normal position in qustion, and when the head is again restored to such normal position, the enlargement will lie crosswise of the slot and prevent radial displacement of the ring-end. It will be clear that the member can only be turned to release such enlargement from the slot by first deflating the tire so as to permit the side wall of the casing to be moved inwardly a sufficient distance to clear the head on the upper end of the spindle.

Accordingly, once the ring has ben locked to the rim in the fashion just described, there is no danger of the same becoming loose accidentally, but only by special manipulation, in the fashion described.

The member will require to be initially made in two parts, either the head 21 or the enlargement 26 being riveted or welded to the spindle 20 after the latter has been inserted in the aperture 22 in the ring. Thereupon, the member remains at all times attached to such ring, and there is consequently no possibility of its becoming lost. Moreover, no special tool will be required to operate the device, a pincers or wrench serving to turn the same providing it fits too tightly to permit this being done with the fingers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a side-flange removably mounted on said rim; and movable means, permanently carried by said flange, adapted to interengage with said rim to secure said flange thereto, said means being formed and disposed for engagement with a tire seated on said rim whereby said means are normally retained against movement, substantially as described.

2. The combination with a wheel rim; of a side-flange removably mounted on said rim; and means adapted to secure said flange to said rim, said means including a member movably mounted in said flange and adapted in one position to interlock with said rim, said member being formed and disposed for engagement with a tire seated on said rim whereby said member is normally retained against movement, substantially as described.

3. The combination with a wheel rim; of a side-flange removably mounted on said rim; and means adapted to secure said flange to said rim, said means including a member rotatably mounted in said flange about a radial axis and adapted in one position to interlock with said rim.

4. The combination with a wheel rim; of a side-flange removably mounted on said rim; and means adapted to secure said flange to said rim, said means including a member movably mounted in said flange and adapted in one position to interlock with said rim, said member being formed and disposed for engagement by the tire on said rim, whereby said member is normally retained in such interlocking position.

5. The combination with a wheel rim; of a side-flange removably mounted on said rim; and means adapted to secure said flange to said rim, said means including a member rotatably mounted in said flange about a radial axis and adapted in one position to interlock with said rim, said member being formed and disposed for engagement by the tire on said rim, whereby said member is normally retained in such interlocking position.

6. The combination with a wheel rim; of a transversely split side-flange removably mounted on said rim, the ends of said flange having circumferentially interlocking engagement with said rim and one such flange-end overlapping the other; and means adapted to secure such overlapping flange-end against radial displacement, such means including a member movably mounted therein and adapted in one position to interlock with said rim.

7. The combination with a wheel rim; of a transversely split side-flange removably mounted on said rim, the ends of said flange having circumferentially interlocking engagement with said rim and one such flange-end overlapping the other; and means adapted to secure such overlapping flange-end against radial displacement, such means including a member rotatably mounted therein about a radial axis and adapted in one position to interlock with said rim.

8. The combination with a wheel rim; of a transversely split side-flange removably mounted on said rim, the ends of said flange having circumferentially interlocking engagement with said rim and one such flange-end overlapping the other; and means adapted to secure such overlapping flange-end against radial displacement, such means including a member rotatably mounted therein about a radial axis and adapted in one position to interlock with said rim, said member being formed and disposed for engagement by the tire on said rim, whereby said member is normally retained in such interlocking position.

9. The combination with a wheel rim formed with an elongated slot near one edge; of a side-flange removably mounted on said rim about such edge; a member rotatably mounted in one end of said flange about a radial axis, said member being provided at its inner end with an enlargement adapted in one position of said member to pass through the slot in said rim and in another position to interlock with said rim; and means adapted to prevent radial displacement of the other end of said flange.

10. The combination with a wheel rim formed with an elongated slot near one edge; of a side-flange removably mounted on said rim about such edge; a member rotatably mounted in one end of said flange about a radial axis, said member being provided at its inner end with an enlargement adapted in one position of said member to pass through the slot in said rim and in another position to interlock with said rim, and said member being provided with a head at its outer end adapted in such interlocking position to be engaged by a tire on said rim and thereby hold said member against rotation; and means adapted to prevent radial displacement of the other end of said flange.

Signed by me, this 3rd day of October, 1916.

JOHN F. OBERLIN.